United States Patent
Tokunaga

(10) Patent No.: US 6,739,366 B2
(45) Date of Patent: May 25, 2004

(54) TIRE BUILDING APPARATUS

(75) Inventor: Toshio Tokunaga, Fuchu (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/873,428

(22) Filed: Jun. 5, 2001

(65) Prior Publication Data

US 2002/0011312 A1 Jan. 31, 2002

(30) Foreign Application Priority Data

Jun. 6, 2000 (JP) ........................................ 2000-168474

(51) Int. Cl.$^7$ ............................................... B29D 30/24
(52) U.S. Cl. ..................... 156/398; 156/414; 156/417
(58) Field of Search ................................ 156/131, 132, 156/133, 135, 398, 400–403, 414–417

(56) References Cited

U.S. PATENT DOCUMENTS

| | | | |
|---|---|---|---|
| 3,816,218 A | * | 6/1974 | Felten ........................ 156/401 |
| 4,239,579 A | * | 12/1980 | Felten et al. ................. 156/415 |
| 4,243,451 A | | 1/1981 | Kortman |
| 4,325,764 A | | 4/1982 | Appleby et al. |
| 5,223,074 A | * | 6/1993 | Miyanaga et al. .......... 156/398 |
| 5,273,612 A | | 12/1993 | Suetomi et al. |

FOREIGN PATENT DOCUMENTS

| | | |
|---|---|---|
| EP | 1 145 834 A2 | 10/2001 |
| WO | WO 92/07708 | 5/1992 |

* cited by examiner

*Primary Examiner*—Geoffrey L Knable
(74) *Attorney, Agent, or Firm*—Sughrue Mion, PLLC

(57) ABSTRACT

A tire building apparatus comprises a group of many segments enlarging to pushingly lock a bead portion of a green tire, a ring-shaped inner piston engaging with each segment of such a group, a ring-shaped outer piston contacting and engaging with a back face of the inner piston, a cylinder slidably housing the inner piston and the outer piston therein, a pair of gas pressure acting means moving each of the inner piston and outer piston inward or outward in the direction of the axial line, and a stopper formed in the cylinder.

10 Claims, 6 Drawing Sheets

# TIRE BUILDING APPARATUS

BACKGROUND OF THE INVENTION

1. Field of the Invention

This invention relates to a tire building apparatus, and more particularly to tire building apparatus laminating uncured materials such as a belt material, a tread rubber material and the like onto a green case for a radial ply tire and capable of particularly positioning an accurate centering of a green case transferred from another building apparatus.

2. Description of Related Art

A tire building apparatus conducting the building at two stage is as follows.

That is, a tire building apparatus of a first stage laminates an innerliner rubber material, a radial carcass ply material, a bead core material and rubber materials surrounding them (a bead filler rubber or a stiffener rubber, and a chafer rubber) and, if necessary, a sidewall rubber material together to form a cylindrical green case. In this case, all materials are uncured materials and so forth on.

Then, outlines of two conventional tire building apparatuses 50, 50A of a second stage are described with reference to FIGS. 5 and 6, wherein such apparatuses are shown as a right-half section of their main part in FIGS. 5 and 6, respectively. Each of the building apparatuses 50, 50A comprises a pair of grasping members 52, 53 airtightly grasping an expandable cylindrical bladder 51, and a group of many segments 54 each slidably engaging with the outer grasping member 53. They form a building drum.

And also, each of the building apparatuses 50, 55A comprises a pair of ring-shaped pistons 55, 55A engaging with the group of these segments 54 and enlarging each segment 54 by its inward movement along a rotating axial line X, and a pair of opposed double-wall cylinders 56 slidably housing the pistons 55, 55A therein. Each of the segments 54 is provided on a side of an outer periphery with a flange 54f located inward in the direction of the rotating axis X.

In the apparatuses 50, 50A shown in FIGS. 5 and 6, the piston 55, 55A locates at an operating standby position. The cylinder 56 has a space 56S at a back side of the piston 55, 55A. The space 56S is connected to a supply means of a pressurized gas such as pressurized air or the like (not shown) and a vacuum means (not shown). The piston 55, 55A is provided with a slant face 55s, 55As taperingly extending toward an inward top in the direction of the rotating axis. On the other hand, each of the segments 54 has a disc 54d rotatably contacting with the slant face 55s, 55As.

The tire building using the apparatuses 50, 50A will be described simply below. At first, a green case GC is transferred by a ring-shaped grasping device (shown by a phantom line) grasping the green case from its outside to an outer peripheral side of the bladder 51 and subjected to a centering with respect to the group of the segments 54. At a state of holding the green case, the piston 55, 55A is moved inward in the rotating axial direction by supplying the pressurized gas to the space 56S.

The disc 54d rises on the slant face 55s, 55As accompanied with the above movement. Thus, the group of the segments 54 is enlarged in the radial direction, whereby each of the flanges 54f is located inward in the vicinity of each bead portion Bp of the green case GC. In this case, the outer peripheral face 54os of each segment 54 is separated away from the inner face of the bead portion Bp. This is a first stage of enlarging the segments 54.

Thereafter, the group of the segments 54 is moved outward in the direction of the rotating axis X to enlarge the segments in the radial direction and hence widen a width of the building drum, whereby each of the flanges 54f is pushed onto the inside of the bead portion Bp in the green case GC. Then, the group of the segments 54 is further enlarged in the radial direction to push the outer peripheral face 54os of the segment 54 to the inner face of the bead portion Bp, whereby the pair of the bead portions Bp are engaged with the group of the segments 54. This is a final stage of enlarging the segments 54 in the radial direction. As such a state, the green case GC is released from the grasping device 60 and moved into a subsequent building step.

In case of the apparatus 50 shown in FIG. 5, however, even if a pressure of the pressurized gas to be supplied to the space 56S is adjusted by any processes in a gas supplying source, a space required between the outer peripheral face 54os of the segment 54 and the inner face of the bead portion Bp can not be ensured due to the scattering of the adjusted pressure and the scattering of slide resistance of the piston 55 and hence both faces are at a state of contacting with each other. When the width of the building drum is widened at such a state, there is caused a large change in the centering of the green case GC with respect to the building drum through the grasping device 60.

In this connection, the apparatus 50A shown in FIG. 6 has a merit that the change in the centering is made smaller than that in the apparatus 50. That is, the piston 55A of the apparatus 50A has such a structure that the slant face 55As is divided into two slant face portions 55As-1 and 55As-2 and a flat face portion 55Asf is positioned between the slant face portions. Thus, it is intended to control a quantity of each segment 54 enlarged to a given value on the flat face portion 55Asf. Even in this case, however, it can not be avoided to have an influence by the scattering of the adjusted pressure and the scattering of slide resistance of the piston 55, so that it is not ensured to stay the rotatably contacting disc 54d on the flat face portion 55Asf. As a result, there is caused a big change of the centering, which is said to be smaller than that of the apparatus 50 but can not overlook at all.

Such a change of the centering brings about the occurrence of poor uniformity in a tire after an uncured tire is subjected to tire building through vulcanization. This type of the centering change occurs over all tires. Particularly, in case of a tire having a structure that a carcass ply is not arranged in at least a central region of a tread portion, an elongation of a portion not existing the carcass ply in the direction of the rotating axis X becomes large and hence the change of the centering is considerably large, which is a serious problem.

SUMMARY OF THE INVENTION

It is, therefore, an object of the invention to provide an apparatus eliminating all of the aforementioned problems, concretely a tire building apparatus capable of accurately and easily holding a centering of a green case transferred to a given position and positioned once to a building drum even if there are existent various scattering factors in the operation of the building apparatus and completely eliminating poor tire uniformity due to the change of the centering.

According to the invention, there is the provision of a tire building apparatus comprising a group of many segments enlarging a size in a radial direction to pushingly lock a bead portion of a green tire, a ring-shaped inner piston engaging with the segments of such a group and moving inward in a direction of an axial line to enlarge the size of each of the segments, a ring-shaped outer piston contacting and engaging with a back face of the inner piston to move the inner piston inward in the direction of the axial line, a cylinder slidably housing the inner piston and the outer piston in its double wall, a pair of gas pressure acting means moving each of the inner piston and outer piston housed in the double wall inward or outward in the direction of the axial line, and a stopper formed in the cylinder for stopping the inward movement of the outer piston at a given position before the completion of the inward movement of the inner piston.

In a preferable embodiment of the invention, the inner piston has a slant face taperingly extending toward its inner top end and contacting and engaging with each of the segments, and the slant face has a mechanism that the size of the segment is enlarged in the radial direction accompanied with the inward movement of the inner piston.

In another preferable embodiment of the invention, the group of segments has a tensile elastic means stretching in the radial direction in the enlargement of the size of the segment and is provided on inner end portion in the radial direction with a wheel rotatably contacting with the slant face of the inner piston.

In the other preferable embodiment of the invention, the inner piston has a first-stage moving stroke corresponding to a moving stroke of the outer piston and a second-stage moving stroke further moving over the moving stroke of the outer piston to conduct the size enlarging operation of each of the segments at two stages.

In a further preferable embodiment of the invention, the group of segments has a push-locking face at a first size-enlarging stage having a clearance of 0.5–1.0 mm to an inner face of the bead portion of the green tire and a push-locking face at a second size-enlarging stage pushingly locking the bead portion of the green tire.

In a still further preferable embodiment of the invention, the gas pressure acting means is provided with a pressurized gas supply device for supplying two kinds of high-pressure and low-pressure gases, and the pressurized gas supply device has means for supplying a low-pressure gas to a back face of the outer piston and means for supplying a high-pressure gas to a back face of the inner piston and a back face of the outer piston, respectively.

In another preferable embodiment of the invention, the cylinder has a gas path communicating to an exterior at a back face size of the inner piston in a waiting position thereof and a gas space located at the back face side of the outer piston in the waiting position, and means for supplying a high-pressure gas is connected to the gas path and a pressurized gas supply device for supplying two kinds of high-pressure and low-pressure gases is connected to the gas space.

In the other preferable embodiment of the invention, the pressurized gas supply device for supplying two kinds of high-pressure and low-pressure gases in the gas pressure acting means comprises a first check valve, a pipe connecting a gas inlet port of the check valve to the gas space and a pipe connecting a gas outlet port of the check valve to the gas path, and the first check valve has a cracking pressure exceeding a pressure of a low-pressure gas but being less than a pressure of a high-pressure gas.

In a further preferable embodiment of the invention, the gas pressure acting means comprises a vacuum means and a directional control valve switching connection to the vacuum means and connection to the gas space in the pressurized gas supply device, and the gas space is communicated with the pressurized gas supply device and the vacuum means through the directional control valve.

In a still further preferable embodiment of the invention, the gas pressure acting means comprises a first check valve and a second check valve arranged in series, and the second check valve is connected at its gas inlet port to a gas outlet port of the first check valve and at its gas outlet port to a gas inlet port of the first check valve, and the second check valve has a cracking pressure exceeding a vacuum pressure but being less than an atmospheric pressure.

BRIEF DESCRIPTION OF THE DRAWINGS

The invention will be described with reference to the accompanying drawings, wherein.

DETAILED DESCRIPTION OF THE INVENTION

An embodiment of the invention will be described with reference to FIGS. 1–4.

Figure 1:
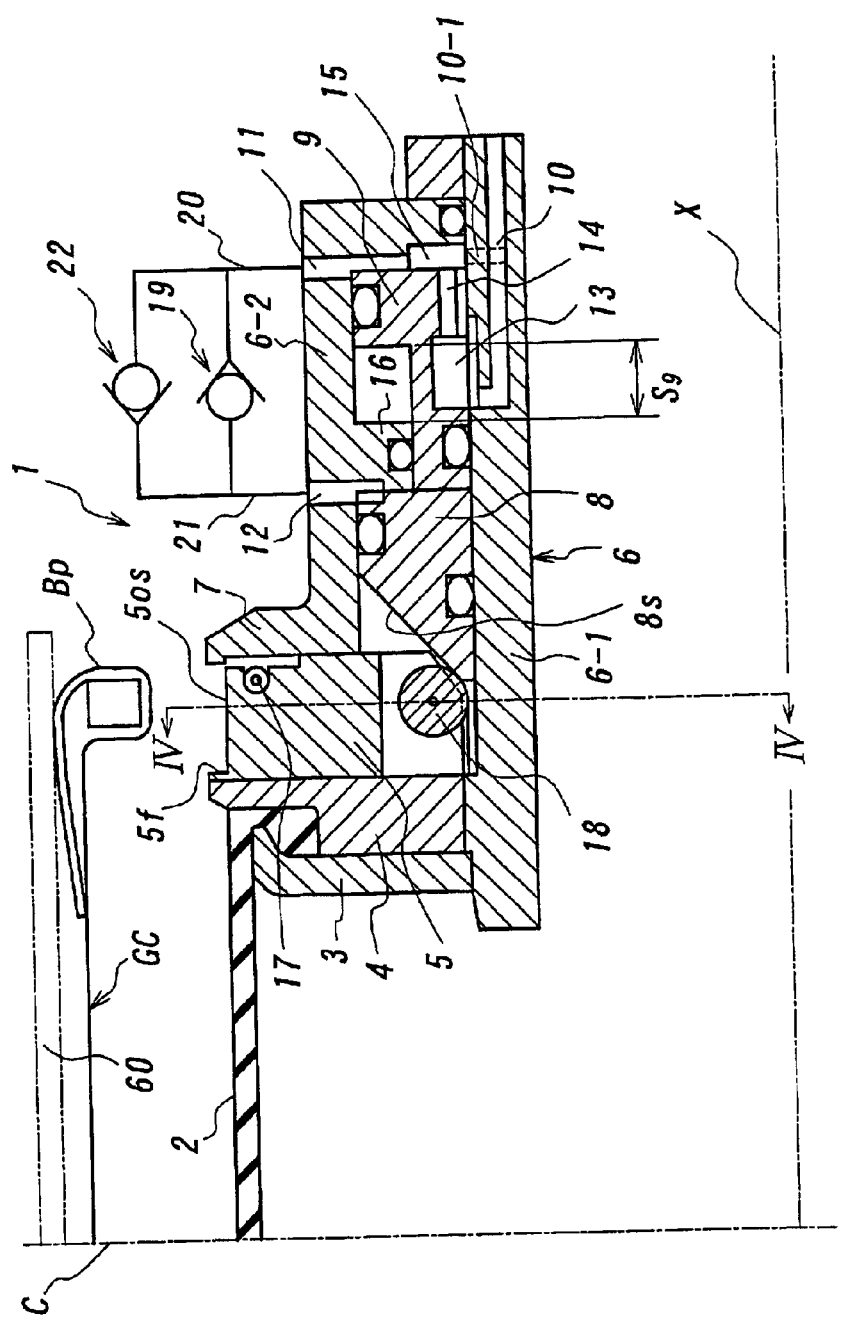
FIG. 1 is a diagrammatically right-upper half section view of a main part in the tire building apparatus according to the invention.
Figure 2:
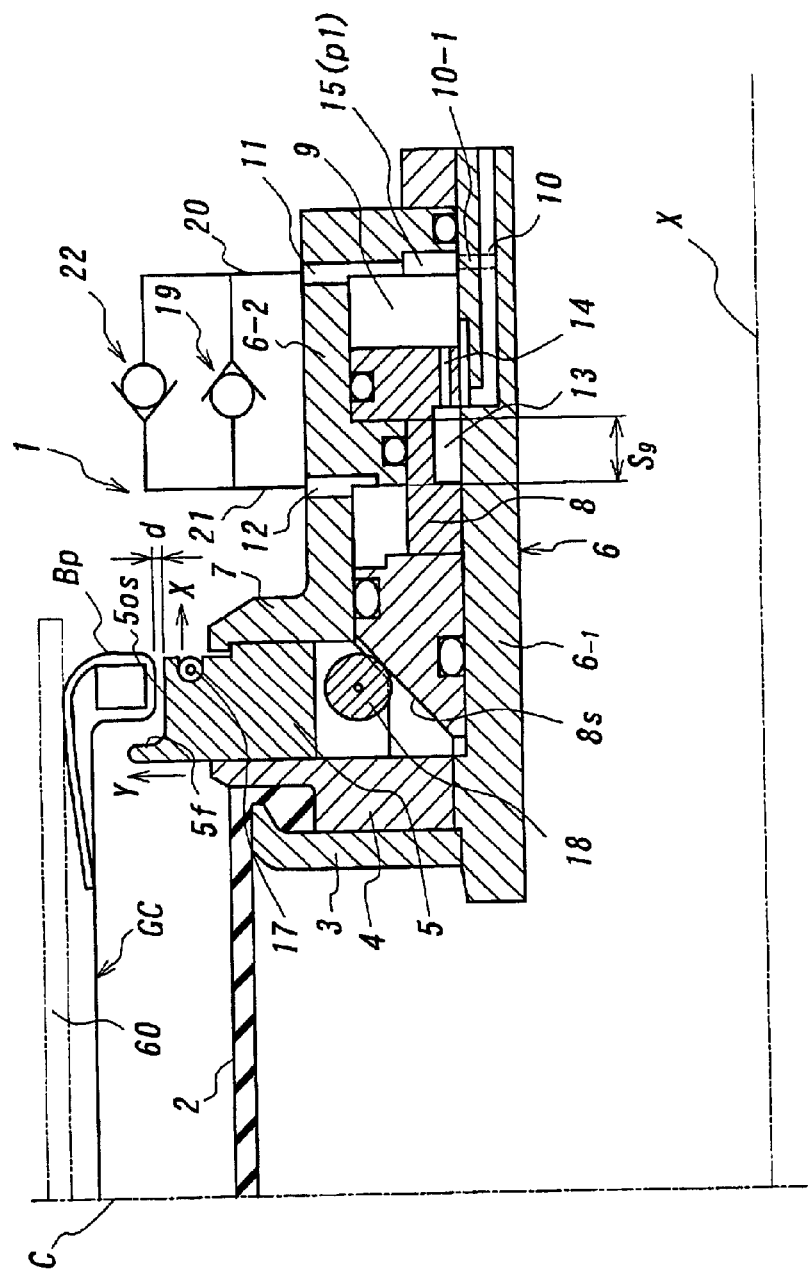
FIG. 2 is a diagrammatically section view illustrating an operation of segments at a first stage in the apparatus shown in FIG. 1.
Figure 3:
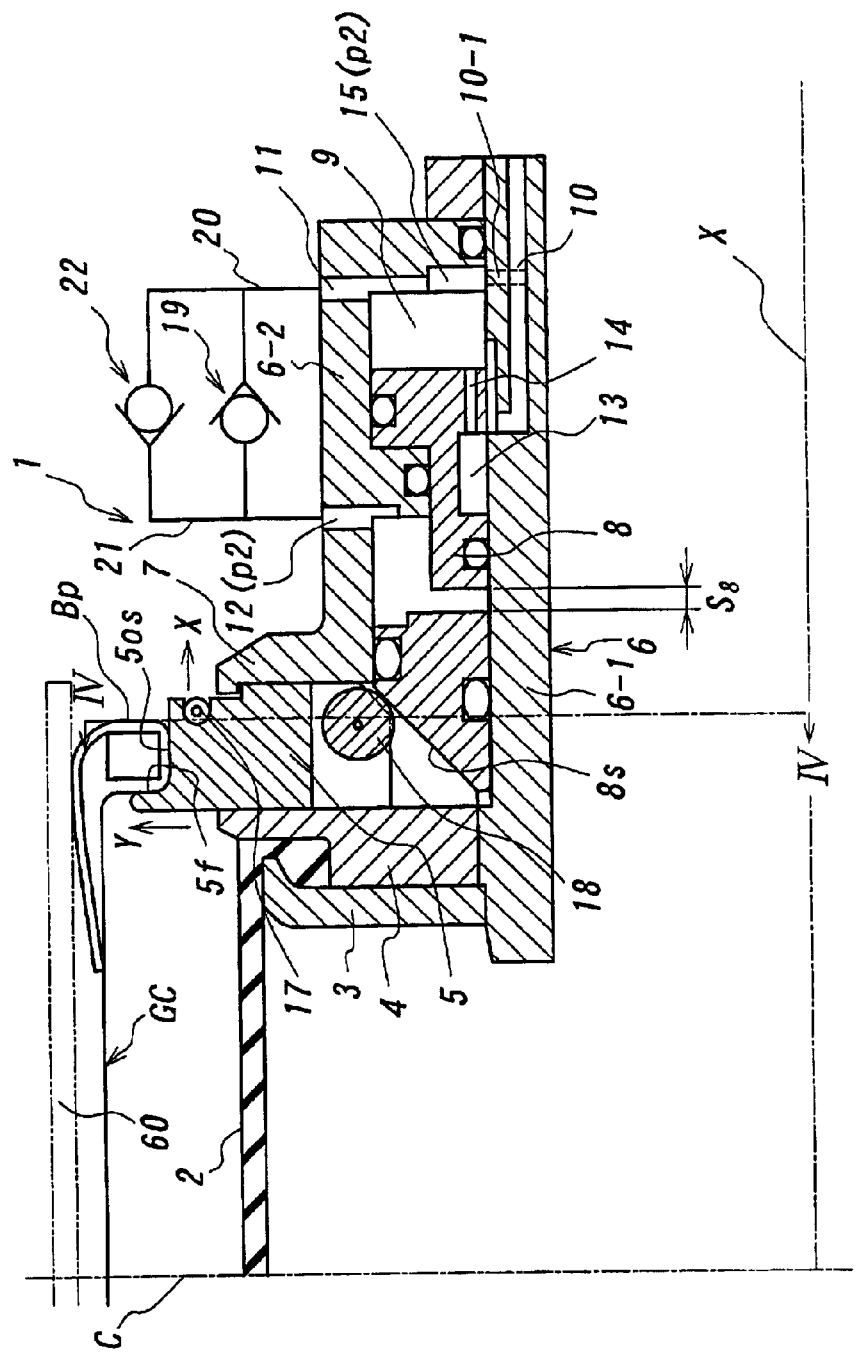
FIG. 3 is a diagrammatically section view illustrating an operation of segments at a second stage in the apparatus shown in FIG. 1.

In FIGS. 1–3, a tire building apparatus 1 comprises a bladder 2 being rich in the expandability, and a pair of inner rings 3 and a pair of outer rings 4 airtightly grasping both end portions of the bladder 2. And also, the apparatus 1 comprises a group of many segments 5 slidably engaging with an outer face of the outer ring 3. These bladder 2, inner ring 3, outer ring 4 and group of segments 5 form a building drum for directly building a green case GC into an uncured tire (not shown).

The bladder 2 locates in a center of the building drum in a widthwise direction thereof. The building drum is rotated around a rotating axial line X by actuating a driving device (not shown) through a rotating shaft (not shown). And also, the group of segments 5 is enlarged from a non-driving waiting position in a radial direction to push and lock a bead portion Bp of an uncured tire or a green case GC in the illustrated embodiment from an inner face thereof.

Furthermore, the apparatus 1 comprises a pair of opposed cylinders 6, each of which cylinders 6 is provided with a double wall of an inner wall 6-1 and an outer wall 6-2. The inner ring 3 and the outer ring 4 are fixed to the inner wall 6-1. The outer wall 6-2 is provided with a ring 7 serving as a slide guide for the group of segments 5 together with the outer ring 4.

Moreover, the apparatus 1 comprises a pair of ring-shaped inner pistons 8 and a pair of ring-shaped outer pistons 9 slidably housing in the double wall 6-1, 6-2 in the pair of the opposed cylinders 6. The inner piston 8 is engaged with the group of segments 5 and moved inward to enlarge the each segment 5. The outer piston 9 plays a role of moving the inner piston 8 inward by contacting and engaging with the back face of the inner piston 8 during the inward movement thereof. The outer piston 9 at the waiting position shown in FIG. 1 contacts and engages with the inner piston 8. However, the inner piston 8 may be separated away from the outer piston 9 located at the waiting position, if necessary. The term "inward" used herein means a direction directing toward the widthwise center of the building drum.

The apparatus 1 comprises a pair of gas pressure acting means. The gas pressure acting means comprises a pressurized gas supply means (not shown) and a gas vacuum means (not shown). The both means comprise a pressurized gas supply device (not shown), a vacuum device (not shown), gas paths 10, 11, 12, 13, 14 connecting to these devices, and a gas space 15 communicating with the gas path 14. In the illustrated embodiment, the gas paths 10, 11, 12 and the gas space 15 are formed in the cylinder 6, while the gas paths 13, 14 are formed in an inner peripheral side of the outer piston 9. Instead that the gas paths 13, 14 are omitted, a gas path 10-1 shown by a phantom line in FIG. 1 may directly be connected to the gas space 15.

The pair of gas pressure acting means have a function of independently moving the inner piston 8 and the outer piston 9 in the double wall 6-1, 6-2 inward and outward by the actuation of the pressurized gas supply means and the gas vacuum means. An outline of such a function is described below.

That is, the outer piston 9 located at the waiting position shown in FIG. 1 is moved inward by supplying a pressurized gas, e.g. pressurized air of a given pressure p1 from the pressurized gas supply means to the gas space 15 as shown in FIG. 2. The inward movement of the outer piston 9 moves the inner piston 8 inward and enlarges the group of segments 5 engaging with the inner piston 8 in a direction of an arrow Y (see FIG. 2).

The cylinder 6 is provided with a ring-shaped stopper 16 protruding from the outer wall 6-2 toward a space inside the cylinder 6. The stopper 16 is arranged at a position of locking the inward moving outer piston 9 to a given position before the completion of the inward movement of the inner piston 8.

Thereafter, a pressurized gas of a given pressure p2 having a relation of p2>p1 is supplied from the pressurized gas supply means to the gas path 12. In this case, however, the pressure p1 is maintained as an independent pressurized gas supply. As shown in FIG. 3, the inner piston 8 is further moved inward independently by introducing the pressurized gas of high-pressure p2 to increase an enlarging quantity of the group of segments 5. At the completion of the movement of the inner piston 8, the group of segments 5 pushes and locks an inner face of a bead portion Bp of a green case GC.

On the other hand, the vacuum device is actuated to suck the gas from the gas space 15 to thereby render the back face of the outer piston 9 into a negative pressure, and to suck the gas from the gas path 12 to thereby render the back face of the inner piston 8 into a negative pressure, whereby the inner piston 8 and the outer piston 9 are moved outward up to the waiting position.

As mentioned above, the apparatus 1 has such a characteristic that the inward movement of the piston is divided into a first inward movement of the inner piston 8 accompanied with the inward movement of the outer piston 9 and a second inward movement of only the inner piston 8. For this end, the apparatus 1 can surely and easily conduct the two-stage enlarging action of each segment 5 to the bead portion Bp of the green case GC without being quite influenced by other scattering factors or uncontrollable factors such as gas pressure, friction resistance and the like.

At the first-stage enlarging action shown in FIG. 2, a flange 5*f* at an outer periphery inner end of each segment 5 in the segment group is located at a position contacting with an inner face of the bead portion Bp, while a push-locking face 5*os* of each segment 5 in the segment group can surely hold a desired slight clearance to the inner face of the bead portion Bp. At such a state, the building drum is enlarged from a widthwise center C at an equal distance in right and left direction shown by an arrow X (see FIG. 2) to contact the flange 5*f* with the inner face of the bead portion Bp.

Therefore, the apparatus 1 does not utterly affect the centering of the green case GC positioned once in the enlargement of the building drum. This is advantageous not only in the green case GC having a usual ply structure but also the green case GC having a special middle-removed ply structure for holding the centering.

After the enlargement of the building drum is conducted the second-stage enlarging action shown in FIG. 3. In this way, the push-locking face 5*os* of each segment 5 in the segment group strongly locks the bead portion Bp from its inner face. After such a locking, another pressurized gas (pressurized air) is filled in an inside of the bladder 2 according to the known tire building process while narrowing the building drum to expand the green case GC, and a composite of a belt member and a tread rubber member is laid on the expanded green case GC. Thereafter, a sidewall rubber member is laid thereon to complete an uncured tire.

Thereafter, the inner and outer pistons 8, 9 are returned to a state shown in FIG. 1, whereby each segment 5 in the segment group is contracted and a complete uncured tire is taken out from the apparatus 1. Since the uncured tire is formed under a sufficient centering, the uniformity of a product tire after the vulcanization resulted from the change of the centering is superior to that of the conventional tire.

The details of the apparatus 1 will be described below.

At first, the inner piston 8 comprises a slant face 8*s* taperingly extending toward an inward top end thereof. The slant face 8*s* contacts and engages with an inward top of each segment 5 in the radial direction. Therefore, each segment 5 is enlargedly moved in the radial direction shown by an arrow Y in FIGS. 2 and 3 by the inward movement of the slant face 8*s* along an axial line X.

Figure 4:
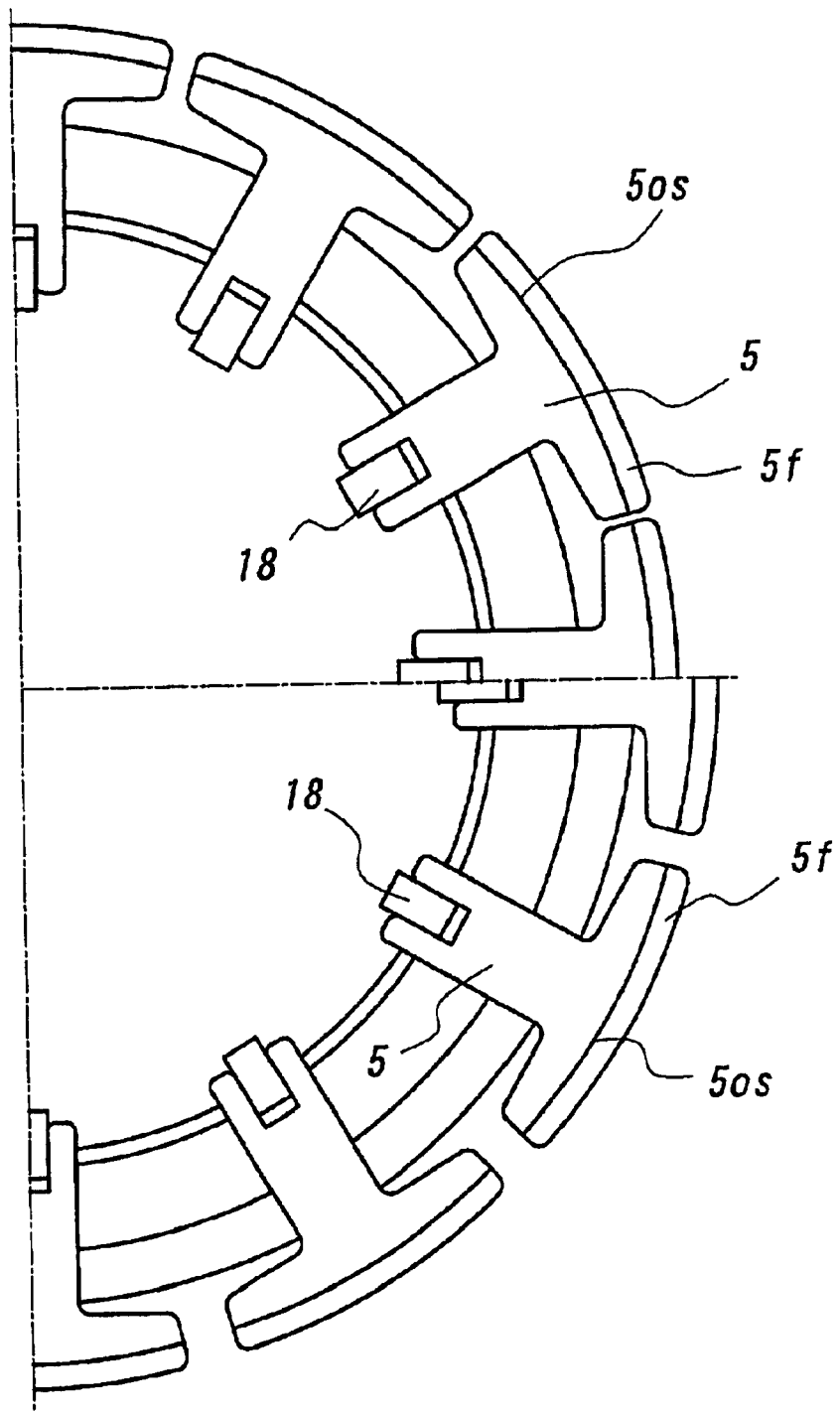
FIG. 4 is a left-half back view illustrating segments taken along a line IV—IV of FIGS. 1 and 3.
Figure 5:
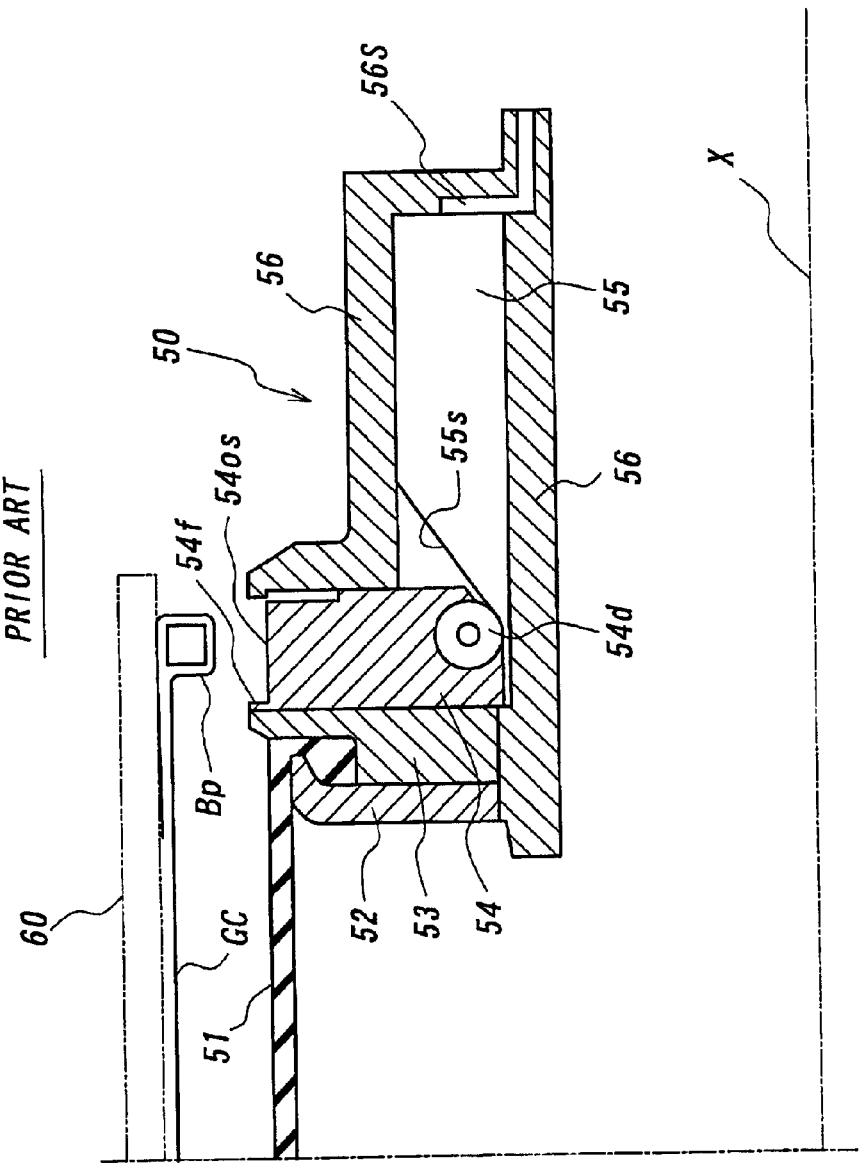
FIG. 5 is a diagrammatically right-upper half section view of a main part in the conventional tire building apparatus.
Figure 6:
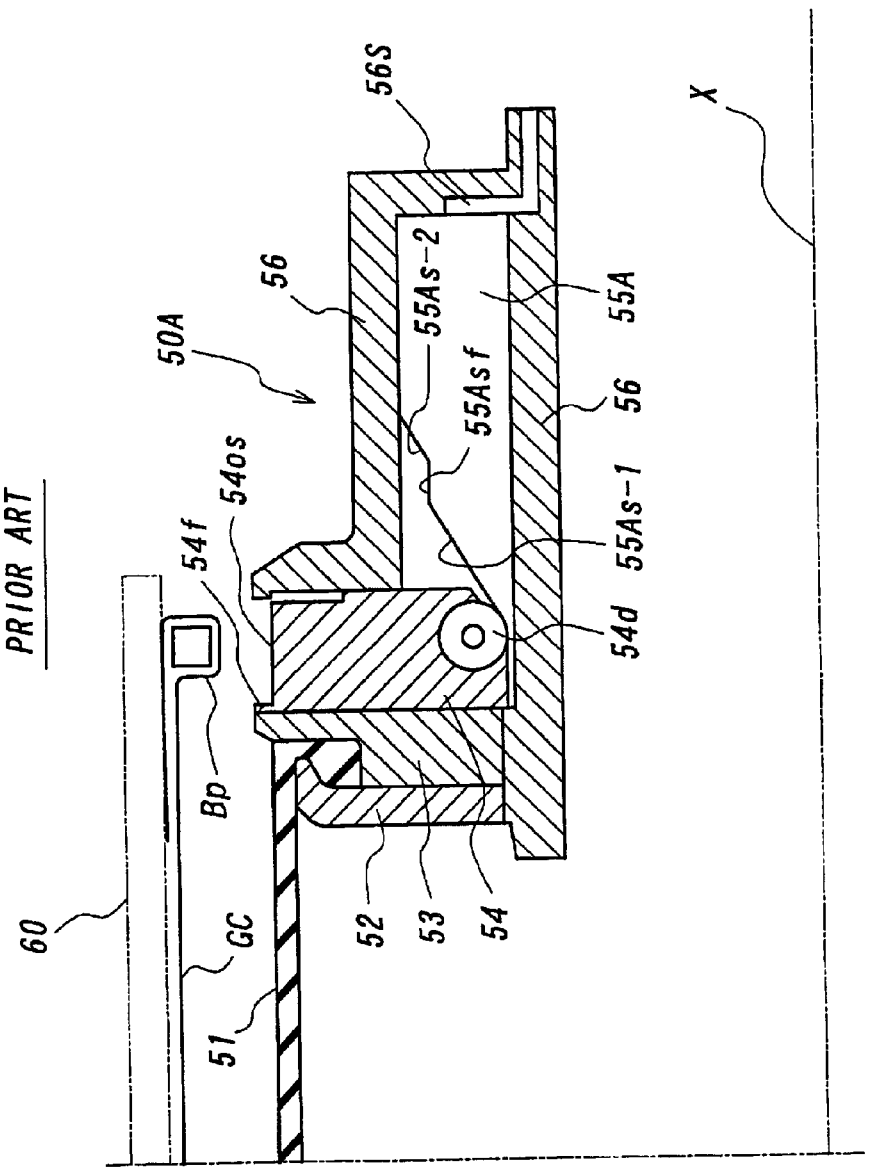
FIG. 6 is a diagrammatically right-upper half section view of a main part in another conventional tire building apparatus.

Each segment 5 in the segment group comprises a tensile elastic means 17 stretching in the radial direction in the enlargement, preferably an annular tension coil spring 17, and a wheel 18 located at its inner end portion in the radial direction. Referring to FIG. 4, the wheel 18 is rotatably attached to a thickness center of the segment 5.

The wheel 18 rotatably contacts with the slant face 8*s* of the inner piston 8. As a result, the movement of the inner piston 8 along the axial line X can be converted into the movement of the segment 5 in the radial direction or the enlarging and contracting movement of the segment 5. The annular tension coil spring 17 guarantees the smooth enlarging and contracting movement of the segment 5. Moreover, the upper part of FIG. 4 shows the segments 5 before the enlargement, and the lower part of FIG. 4 shows the segments 5 after the final enlargement. In the illustrated embodiment, the segment group consists of twelve segments 5.

The inner piston 8 shown in FIG. 1 has a first-stage moving stroke corresponding to a moving stroke $S_9$ of the outer piston 9 (see FIG. 1). However, a first-stage moving stroke of the inner piston 8 located apart from the outer piston 9 in the waiting position is shorter than the stroke $S_9$. In any case, the inner piston 8 further has a second-stage moving stroke $S_8$ over the moving stroke $S_9$ of the outer piston 9 (see FIG. 3). By such two-stage strokes of the inner piston 8 is carried out the two-stage enlarging action of the segment 5. The inner piston 8 moving outward is stopped by locking the back face at an inner face of the stopper 16.

As shown in FIG. 2, the group of segments 5 is set so that the push-locking face 5os at the first enlarging stage has a clearance d of 0.5–1.0 mm to the inner face of the bead portion Bp in the green case GC. When the clearance is within the above range, it is possible to absorb various errors and scatterings, whereby the push-locking face 5os is never contacted with the inner face of the bead portion Bp at the first stage.

The aforementioned gas pressure acting means has means for supplying two kinds of pressures, high and low pressures p2, p1 from the pressurized gas supply device to the inside of the cylinder 6. The gas supply means of high and low pressures p2, p1 comprises means for supplying a gas of low-pressure p1 to the back face of the outer piston 9 and means for supplying a gas of same high-pressure p2 to the back face of the inner piston 8 and the back face of the outer piston 9. For instance, the low-pressure p1 is 0.2–0.3 MPa, and the high-pressure p2 is 0.5–0.6 MPa.

Moreover, the cylinder 6 comprises the gas path 12 communicating with exterior at the back face side of the inner piston 8 located in the waiting position, the gas space 15 located at the back face side of the outer piston in the waiting position, and the gas path 11 communicating therewith. Therefore, the gas supply means of the high-pressure p2 is connected to the gas path 12, while the gas supply means of high and low pressures p2, p1 is connected to the gas space 15.

Concretely, as shown in FIGS. 1–3, a first check value 19 is applied to the gas supply means of high and low pressures p2, p1. In this case, a gas inlet port of the first check valve 19 is connected to the gas path 11 through a pipe 20. And also, a gas outlet port of the first check valve 19 is connected to the gas path 12 through a pipe 21. The first check valve 19 has a cracking pressure exceeding the low-pressure p1 but being less than the high-pressure p2.

As shown in FIG. 2, the gas of low-pressure p1 conducts the accurate first stage enlargement of the segment 5 through such a cracking pressure without acting to the back face of the inner piston 8. And also, a gas of high-pressure p2 is supplied to the gas space 15, whereby the high-pressure gas passes through the first check valve 19 and acts to the back face of the inner piston 8 through the gas path 12 and hence the inner piston 8 is moved inward as shown in FIG. 3. The cracking pressure is about 0.35 MPa in relation to the values of high and low pressures p2, p1.

Further, the gas pressure means comprises a directional control valve (not shown). The directional control valve switches over the connection of the gas space 15 to the pressurized gas supply means and the vacuum means. The gas space 15 is connected to the gas supply means of high and low pressures p2, p1 and the vacuum means through the directional control valve.

As shown in FIGS. 1–3, the gas pressure acting means has a second check valve 22. In the second check valve 22, a gas inlet port is connected to the gas outlet side of the first check valve 19, and a gas outlet port is connected to the gas inlet side of the first check valve 19. That is, the second check valve 22 is connected to the first check valve 19 in series so as to oppose their inlet ports and outlet ports to each other.

The second check valve 22 has a cracking pressure exceeding a vacuum pressure but less than atmospheric pressure, e.g. about 0.02 MPa. By the directional control valve is discharged the gas from the back face of the inner piston 8 through the second check valve 22 and gas space 15 toward exterior to turn back the inner piston 8 and outer piston 9 to the waiting position. In this way, the segment 5 is turned to the initial state. In FIGS. 1–3, a transfer-grasping means 60 transferring and centering the green case GC onto the building drum and grasping it is shown by a phantom line.

As mentioned above, according to the invention, there can be provided a tire building apparatus capable of centering the green case to the tire building drum irrespectively of various scattering factors of the building operation and conducting the subsequent building operation under the centering without causing the change of centering and manufacturing a tire having an excellent uniformity.

What is claimed is:

1. A tire building apparatus comprising:
    a group of many segments adapted to be enlarged in the radial direction to pushingly lock a bead portion of a green tire;
    a ring-shaped axially inner piston engaging with the segments of such a group and moving inward in a direction of an axial line to enlarge the size of each of the segments;
    a ring-shaped axially outer piston contacting and engaging with a back face of the inner piston to move the inner piston inward in the direction of the axial line, the back face being located on the axially outermost part of the ring-shaped axially inner piston;
    a cylinder slidably housing the inner piston and the outer piston in its double wall;
    a pair of pressure acting means moving each of the inner piston and outer piston housed in the double wall inward or outward in the direction of the axial line; and
    a stopper formed in the cylinder for stopping the inward movement of the outer piston at a given position before the completion of the inward movement of the inner piston.

2. A tire building apparatus according to claim 1, wherein the inner piston has a slant face taperingly extending toward its inner top end and contacting and engaging with each of the segments, and the slant face has a mechanism that the size of the segment is enlarged in the radial direction accompanied with the inward movement of the inner piston.

3. A tire building apparatus according to claim 1, wherein the group of the segments has a tensile elastic means stretching in the radial direction in the enlargement of the size of the segment and is provided on inner end portion in the radial direction with a wheel rotatably contacting with a slant face of the inner piston.

4. A tire building apparatus according to claim 1, wherein the inner piston has a first-stage moving stroke corresponding to a moving stroke of the outer piston and a second-stage moving stroke further moving over the moving stroke of the outer piston to conduct the size enlarging operation of each of the segments at two stages.

5. A tire building apparatus according to claim 1, wherein the group of the segments has a push-locking face at a first size-enlarging stage adapted to have a clearance of 0.5–1.0 mm to an inner face of the bead portion of the green tire and a push-locking face at a second size-enlarging stage pushingly locking the bead portion of the green tire.

6. A tire building apparatus according to claim 1, wherein the gas pressure acting means is provided with a pressurized gas supplying device for supplying two kinds of high-pressure and low-pressure gases, and the pressurized gas supplying device has means for supplying a low-pressure gas to a back face of the outer piston and means for supplying a high-pressure gas to a back face of the inner piston and a back face of the outer piston, respectively.

7. A tire building apparatus according to claim 6, wherein the cylinder has a gas path communicating to an exterior at a back face size of the inner piston in a waiting position thereof and a gas space located at the back face side of the outer piston in the waiting position, and means for supplying a high-pressure gas is connected to the gas path and a pressurized gas supplying device for supplying two kinds of high-pressure and low-pressure gases is connected to the gas space.

8. A tire building apparatus according to claim 7, wherein the pressurized gas supplying device for supplying two kinds of high-pressure and low-pressure gases in the gas pressure acting means comprises a first check valve, a pipe connecting a gas inlet prot of the check valve to the gas space and a pipe connecting a gas outlet port of the check valve to the gas path, and the first check valve has a cracking pressure exceeding a pressure of a low-pressure gas but being less than a pressure of a high-pressure gas.

9. A tire building apparatus according to claim 7, wherein a gas pressure acting means comprises a vacuum means and a change-over valve switching connection to the vacuum means and connection to the gas space in the pressurized gas supplying device, and the gas space is communicated with the pressurized gas supplying device and the vacuum means through the change-over valve.

10. A tire building apparatus according to claim 6, wherein the gas pressure acting means comprises a first check valve and a second check valve arranged in series, and the second check valve is connected at its gas inlet port to a gas outlet port of the first check valve and at its gas outlet port to a gas inlet port of the first check valve, and the second check valve has a cracking pressure exceeding a vacuum pressure but being less than an atmospheric pressure.

* * * * *